(12) United States Patent
Galbreath et al.

(10) Patent No.: US 7,967,389 B2
(45) Date of Patent: Jun. 28, 2011

(54) VEHICLE SEAT ASSEMBLY HAVING LAYERED SEATING SYSTEM

(75) Inventors: Ashford A. Galbreath, Troy, MI (US); Asad S. Ali, Troy, MI (US); Terry O'Bannon, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/873,496

(22) Filed: Sep. 1, 2010

(65) Prior Publication Data

US 2010/0327647 A1 Dec. 30, 2010

Related U.S. Application Data

(63) Continuation of application No. 12/357,084, filed on Jan. 21, 2009, now Pat. No. 7,837,271.

(51) Int. Cl.
 *A47C 7/02* (2006.01)
(52) U.S. Cl. .................................. 297/452.48
(58) Field of Classification Search ............. 297/452.48, 297/452.58, 452.59, 452.6, 452.61
 See application file for complete search history.

(56) References Cited

U.S. PATENT DOCUMENTS

| | | | | |
|---|---|---|---|---|
| 4,060,280 A | * | 11/1977 | Van Loo | 297/452.61 |
| 4,814,036 A | * | 3/1989 | Hatch | 156/245 |
| 5,016,941 A | * | 5/1991 | Yokota | |
| 5,499,413 A | * | 3/1996 | Van Hekken | |
| 5,564,144 A | * | 10/1996 | Weingartner et al. | |
| 5,669,799 A | * | 9/1997 | Moseneder et al. | |
| 5,702,159 A | * | 12/1997 | Matsuoka et al. | |
| 6,018,832 A | * | 2/2000 | Graebe | |
| 6,283,552 B1 | * | 9/2001 | Halse et al. | |
| 6,592,181 B2 | * | 7/2003 | Stiller et al. | |
| 6,896,954 B2 | * | 5/2005 | Omori et al. | |
| 2002/0179469 A1 | * | 12/2002 | Tornga et al. | |
| 2003/0131400 A1 | * | 7/2003 | Clavell | |
| 2003/0176820 A1 | * | 9/2003 | Dabir | |
| 2006/0022505 A1 | * | 2/2006 | Pyzik et al. | |

* cited by examiner

*Primary Examiner* — Lori L Lyjak
(74) *Attorney, Agent, or Firm* — Brooks Kushman P.C.

(57) ABSTRACT

A vehicle seat cushion composite is provided with a structural layer adapted to be mounted within a vehicle to provide support to an occupant. The structural layer has at least two edge regions provided proximate two edges of the structural layer and an inner region at least partially bound within the at least two edge regions. The at least two edge regions have a plurality of concave channels. A cushion layer is adjacent to the structural layer and has a plurality of concave projections sized to be received within the plurality of concave channels of the structural layer for minimizing lateral movement of the cushion layer relative to the structural layer proximate the edge regions.

20 Claims, 4 Drawing Sheets

VEHICLE SEAT ASSEMBLY HAVING LAYERED SEATING SYSTEM

This application is a continuation of U.S. application Ser. No. 12/357,084 filed Jan. 21, 2009, the disclosure of which is incorporated in its entirety by reference herein.

TECHNICAL FIELD

Multiple embodiments relate to a vehicle seat assembly having a layered seating system.

BACKGROUND

Most seat assemblies include three fundamental components: (a) a frame to support the seat assembly and mount it to a body, such as a vehicle; (b) a foam cushion to cover the frame; and (c) trim material to cover the foam cushion and provide a durable surface for contact with a seat assembly occupant. A conventional vehicle seat design typically involves the mixing of base construction polymers joined in a manner that is difficult to disassemble and not focused on environmentally friendly material use.

Accordingly, there is a need for a vehicle seat assembly which is environmentally friendly, structurally sound and comfortable, and relatively easy to assemble and disassemble as needed.

BRIEF DESCRIPTION OF THE DRAWINGS

FIG. 8b is another cross-sectional view of a portion of the vehicle seat assembly of FIG. 8a;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in the description are to be enlisted as modified by the word "about" in describing the broader scope of the invention. Practice within the numerical limit stated is generally preferred. Also, unless expressly stated to the contrary, the description of a group or class of materials is suitable or preferred for a given purpose in connection with the invention implies that mixtures of any two or more members of this group or class may be equally suitable or preferred.

Figure 1:
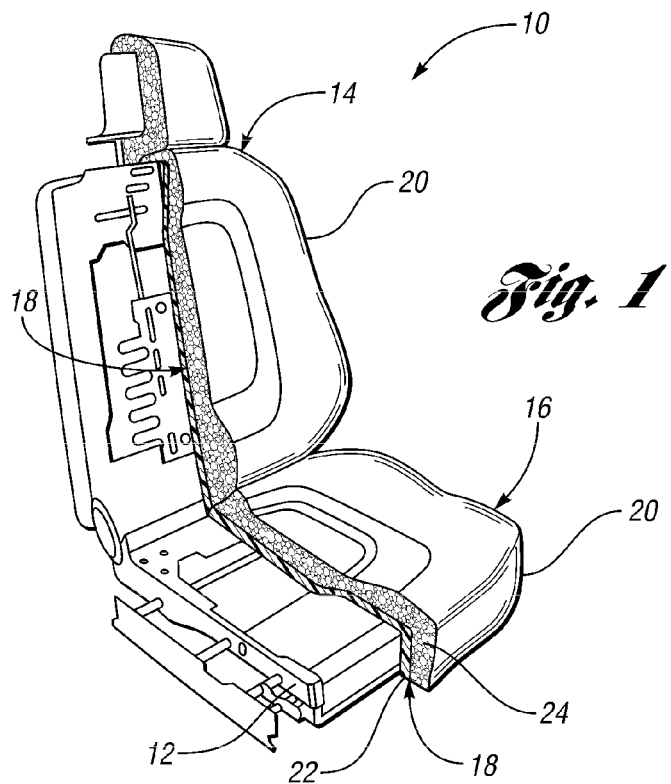
FIG. 1 is a schematic cut-away environmental view of an embodiment of a vehicle seat assembly.

Referring to FIG. 1, a vehicle seat assembly 10 is illustrated. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other configurations where foam is a component, such as backrests, back support pads, armrests, and head restraints. Still further, it should be understood that the principles of this invention are applicable to all types of vehicle seat assemblies. Furthermore, it should be understood that the teachings of the multiple embodiments are not limited to applications on automobiles but may be employed on any type of vehicle including, without limitation, aircraft, watercraft, spacecraft, and other types of landcraft including trains as well as non-vehicle seat assemblies.

As shown in FIG. 1, the vehicle seat assembly 10 includes a seat frame, generally indicated at 12 having a plurality of mounting brackets adapted to operatively secure the seat frame 12 within a vehicle. The seat frame 12 may be constructed from any materials suitable for application within a vehicle seat assembly 10, such as aluminum, steel or other metal alloy, composite material, or a suitable polymer. Further, the seat frame 12 may be manufactured using techniques commonly known in the art, and relative to the type of material employed. By way of example, the manufacturing techniques may include stamping, welding, fastening or molding a suitable material to form the seat frame 12.

The vehicle seat assembly 10 also includes a seat back, generally indicated at 14 and a lower seat assembly, generally indicated at 16. In at least the illustrated embodiment, the seat back 14 and the lower seat assembly 16 each have the same cushion composite 18 covered by a trim material 20. However, it should be understood that the configuration of the cushion composite 18 for the seat back 14 can differ from the configuration of the cushion composite 18 of the lower seat assembly 16. Likewise, it should be understood that the trim material 20 for the seat back 14 can differ from the trim material for the lower seat assembly 16. The cushion composite 18 includes a structural layer 22, in at least the illustrated embodiments, disposed over frame 12 and a cushion layer 24 that is disposed over the structural layer 22. The cushion composite 18 could include other optional layers such as a comfort pad. As will be explained further below, each of the layers cooperate with and in some embodiments are secured to each other in a manner such that they are relatively easily separable for recycling at end of use.

The structural layer 22 can be any suitable structural foam material. In at least one embodiment, suitable structural materials will have a rigidity and/or density that is higher than conventional polyurethane foam. In at least one embodiment, suitable structural foam materials have a density of at least 1.75 pounds per cubic foot (pcf), and less than 7.0 pcf. In at least another embodiment, the suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 Newtons (N), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 pounds per square inch (psi), in at least another embodiment of 30 to 80 psi, and in at least another embodiment of 35 to 65 psi, as measured in accordance with ASTM test method No. D3574.

In at least one embodiment, the structural layer 22 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from Createch LTD.

Expanded polyolefins can be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used. Suitable gases include, but are not limited to air, nitrogen, carbon dioxide, pentene and the like.

While the structural layer 22 can have any suitable size and configuration, in at least one embodiment, the structural layer 22 has an average thickness of five to one hundred millimeters, in other embodiments of twenty to seventy millimeters, and in yet other embodiments of thirty to fifty millimeters. The structural layer 22 may be a seat body that is adapted to be mounted within the vehicle.

The cushion layer 24 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 kilopascals (KPa), in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam. The cushion layer 24 can be any suitable size and shape, however, in at least one embodiment, the cushion layer 24 has an average thickness of twenty to one hundred millimeters, and in at least another embodiment of thirty to seventy millimeters, and in still yet other embodiments of forty to sixty millimeters. The cushion layer 24 may be a seat component that is provided adjacent to the seat body, which may be the structural layer 22.

As discussed, the vehicle seat assembly 10 also includes trim material 20 which is adapted to engage the cushion composite 18 in a covering relationship. The trim material 20 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 20, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (generally known in the art) such as fiberglass, nylon, polyester or natural fibers may be applied to the foam backing or back of the trim material 20 for increase in strength without increasing rigidity. In at least one particularly preferred embodiment, the trim material 20 comprises polyester or nylon trim material having polyester or nylon trim fasteners for securing the trim material 20 to one or more components (i.e., cushion 18 and/or frame 12) of the vehicle seat assembly 10.

When the cushion layer 24 is mounted to the structural layer 22, the cushion layer 24 can move laterally relative to the structural layer 22. Often adhesives velcro, and/or other bonding materials are employed to mount the cushion layer 24 to the structural layer 22 in order to reduce lateral movement of the cushion layer 24. Utilization of adhesives velcro, and/or other bonding materials requires additional material to be added to the cushion composite 18, which increases manufacturing costs by requiring additional material and requiring additional manufacturing time.

Figure 2:
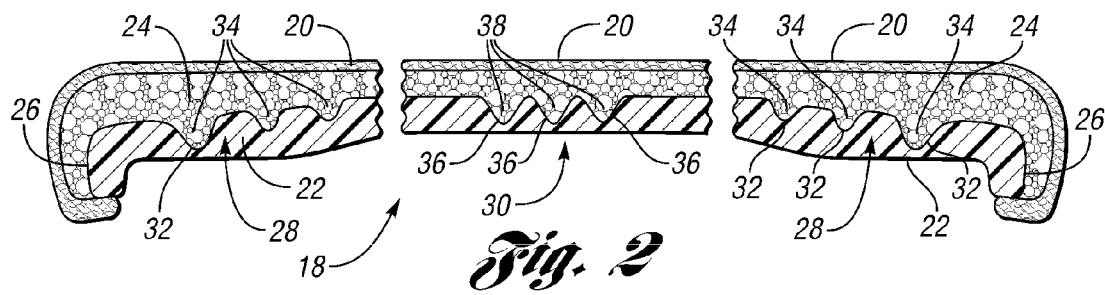
FIG. 2 is a cross-sectional view of a portion of an embodiment of the vehicle seat assembly of FIG. 1.

With reference now to FIG. 2, a cross-sectional view of an embodiment of the cushion composite 18 is illustrated covered by trim material 20. As illustrated, the structural layer 22 of the cushion composite 18 has edges 26. Edge regions 28 are provided proximate the edges 26 of the structural layer 22. Between the edge regions 28 in an inner region 30. As illustrated, the inner region 30 is bound on four sides by the edge regions 28. The edge regions 28 may each have widths of five to ten centimeters in one embodiment. In another embodiment, the edge regions 28 may have widths of ten to twenty centimeters. The edge regions 28 may have similar or varying widths.

The edge regions 28 of the structural layer 22 have a plurality of channels 32 formed therein. In the illustrated embodiment, three channels 32 are formed in each edge region 28. Of course, any suitable amount of channels 32 is contemplated within the scope of the disclosed embodiments.

The channels 32 in the edge regions 28 receive protrusions 34 that extend from the cushion layer 24. During assembly of the cushion composite 18, the protrusions 34 on the cushion layer 24 facilitate proper installation of the cushion layer 24 relative to the structural layer 22 because the protrusions 34 fit into the channels 32 within the structural layer 22. An interference fit may be employed between the channels 32 and the protrusions 34 to retain the protrusions 34 within the channels 32. Of course, the protrusions 34 may be retained within the channels 32 in any suitable manner.

When the cushion composite 18 is in use to support an occupant, the protrusions 34 facilitate alignment of the cushion layer 24 relative to the structural layer 22 and minimize lateral movement of the cushion layer 24 relative to the structural layer 22. Minimization of lateral movement of the cushion layer 24 is important for the cushion composite 18 in order to keep the cushion composite 18 together and comfortable for the occupant. Additionally, locating the channels 32 in the edge regions 28 of the structural layer provides vital retention during occupant ingress and egress as the occupant provides lateral movement of the cushion layer 24 relative to the structural layer 22.

In addition to channels 32 provided in the edge regions 28 of the structural layer 22, channels 36 may be provided within the inner region 30 that is provided between the edge regions 28. Although three channels 36 are illustrated in the inner region 30, any suitable amount of channels 36 is contemplated within the scope of the disclosed embodiments.

The channels 36 in the inner region 30 each receive a protrusion 38 that extends from the cushion layer 24. During assembly of the cushion composite 18, the protrusions 38 on the cushion layer 24 facilitate proper installation of the cushion layer 24 relative to the structural layer 22 because the protrusions 38 fit into the channels 36 within the structural layer 22. An interference fit may be employed between the channels 36 and the protrusions 38 to retain the protrusions 38 within the channels 36. Of course, the protrusions 38 may be retained within the channels 36 in any suitable manner.

When the cushion composite 18 is in use to support an occupant, the protrusions 36 may further facilitate alignment of the cushion layer 24 relative to the structural layer 22 and minimize lateral movement of the cushion layer 24 relative to the structural layer 22. Minimization of lateral movement of the cushion layer 24 is important for the cushion composite 18 in order to keep the cushion composite 18 together and comfortable for the occupant. Lateral movement may occur during occupant ingress or egress, during normal riding conditions when the occupant is sitting upon the cushion composite 18 or during an impact condition when the vehicle is impacted against another object.

When the channels 32 of the edge region 28 of the structural layer 22 and protrusions 34 of the cushion layer 24 and the channels 36 of the inner region 30 of the structural layer 22 and protrusions 38 of the cushion layer 24 are employed, the cushion composite 18 can be secured to the structural layer 22 without the use of adhesives velcro, and/or other bonding materials.

The channels 32, 36 may have various, similar and/or equal depths while the protrusions 34, 38 have corresponding lengths. As illustrated, the channels 32 may have increased depths proximate to the edge 26 of the structural layer 22 to facilitate retention of the cushion layer 24 on the structural layer 22 during occupant ingress and egress, during normal riding conditions and during impact conditions. In one embodiment, at least one of the channels 32, 36 has a depth of approximately five to twenty-five millimeters. A depth of approximately five to twenty-five millimeters facilitates retention of a similarly sized protrusion 34, 38 within the channel 32, 36. In one embodiment, at least one of the channels 32, 36 has a depth of approximately ten millimeters. In another embodiment, at least one of the channels 32, 36 has a depth of approximately fifteen millimeters. In yet another embodiment, at least one of the channels 32, 36 has a depth of approximately twenty millimeters. A larger depth may be felt by the occupant when sitting upon the cushion composite 18, which may decrease comfort for the occupant. Of course, any suitable depth for the channels 32, 36 is contemplated within the scope of the multiple disclosed embodiments.

The channels 32, 36 may also have various, similar and/or equal widths while the protrusions 34, 38 have corresponding widths to fit within the channels 32, 36. In one embodiment, at least one of the channels 32, 36 has a width of approximately five to thirty millimeters. A width of five to thirty millimeters facilitates retention of a similarly sized protrusion 34, 38 within the channel 32, 36. In one embodiment, at least one of the channels 32, 36 has a width of approximately fifteen millimeters. In another embodiment, at least one of the channels 32, 36 has a width of approximately twenty millimeters. In yet another embodiment, at least one of the channels 32, 36 has a width of approximately thirty millimeters. Of course, any suitable width for the channels 32, 36 is contemplated within the scope of the multiple disclosed embodiments.

Figure 3:
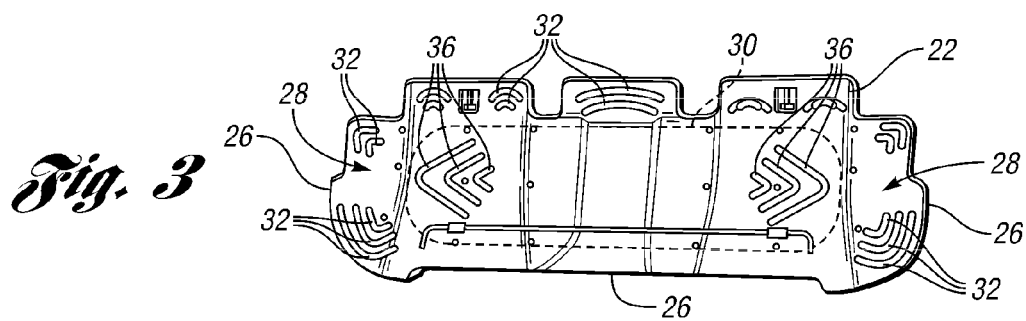
FIG. 3 is a top plan view of a portion of the vehicle seat assembly of FIG. 2.

In FIG. 3, the channels 32 provided in the edge regions 28 of the structural layer 22 and the channels 36 provided within the inner region 30 of the structural layer 22 are illustrated. In the depicted embodiment, the channels 32 formed in the edge regions 28 have a concave profile relative to the edge 28 of the structural member 22, as depicted in the top plan view. The concave channels 32 facilitate retention of the cushion layer 24, as depicted in FIG. 2, because during occupant ingress and egress, the protrusions 34 remain locked within the concave channels 32, which may have an interference fit provided therebetween. The concave channels 32 may have an arcuate shape, as illustrated in the top plan view, or may have an arrow concave shape. Of course, any suitable concave shape for the channels 32 when viewed from the top plan view is contemplated within the scope of the disclosed embodiments.

In the illustrated embodiment, multiple concave channels 32 are formed within the structural layer 22. Providing multiple concave channels 32 may increase retention of the protrusions 34 within the concave channels 32. Additionally, the concave channels 32 may be provided at multiple locations of the edge region 28 of the structural layer 22. The cushion layer 24 shown in FIG. 2 may have corresponding protrusions 34 that are sized to be received within the concave channels 32.

In at least the depicted embodiment of FIG. 3, the channels 36 provided within the inner region 30 the structural layer 22 have a concave profile relative to the edge 28 of the structural member 22. The concave channels 36 retain the protrusions 28 of the cushion layer 24 shown in FIG. 2 when the occupant is resting upon the cushion composite 20 during normal riding conditions or during impact conditions. The concave channels 36 may have an arcuate shape or may have an arrow concave shape illustrated. Of course, any suitable concave channel shape is contemplated for the channels 36 provided within the inner region 30 of the structural layer 22.

Figure 4:
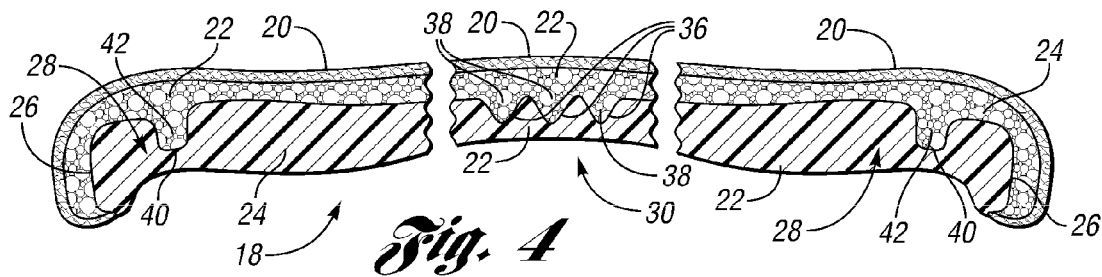
FIG. 4 is cross-sectional view of a portion of another embodiment of the vehicle seat assembly of FIG. 1.

With reference now to FIG. 4, a cross-sectional view of another embodiment of the cushion composite 18 is illustrated with the support layer 22 supporting the cushion layer 24 and covered by trim material 20. In the depicted embodiment, a recess 40 is provided proximate each edge 26 in each edge region 28 of the structural layer 22. The cushion layer 24 has corresponding protrusions 42 that are sized to be received within the recesses 40 of the structural layer 22. The protrusions 42 facilitate locating the cushion layer 24 on to the structural layer 22 during assembly and retain the cushion layer 24 on the structural layer 22 during occupant ingress and egress. An interference fit may be employed between the recesses 40 and the protrusions 42 to retain the protrusions 42 within the recesses 40. Of course, the protrusions 42 may be retained within the recesses 40 in any suitable manner.

The recesses 40 may have various, similar and/or equal depths while the protrusions 42 have corresponding lengths. In one embodiment, at least one of the recesses 40 has a depth of approximately five to twenty-five millimeters. A depth of five to twenty-five millimeters facilitates retention of a similarly sized protrusion 42 within the recesses 40. In one embodiment, at least one of the recesses 40 has a depth of approximately ten millimeters. In another embodiment, at least one of the recesses 40 has a depth of approximately fifteen millimeters. In yet another embodiment, at least one of the recesses 40 has a depth of approximately twenty millimeters. A larger depth for the recesses 40 may be felt by the occupant when sitting upon the cushion composite 18, which may decrease comfort for the occupant. As illustrated, the recess 40 may extend through a portion of the structural layer 22. In at least another embodiment, illustrated in FIGS. 6-8a, the recesses 40 are formed through the structural layer 22 and the protrusions 42 extend through the structural layer 22. Of course, any suitable depth for the recesses 40 is contemplated within the scope of the multiple disclosed embodiments.

The recesses 40 may also have various, similar and/or equal widths while the protrusions 42 have corresponding widths to fit within the recesses 40. In one embodiment, at least one of the recesses 40 has a width of approximately five to thirty millimeters. A width of five to thirty millimeters facilitates retention of a similarly sized protrusion 42 within the recesses 40. In one embodiment, at least one of the recesses 40 have a width of approximately fifteen millimeters. In another embodiment, at least one of the recesses 40 has a width of approximately twenty millimeters. In yet another embodiment, at least one of the recesses 40 has a width of approximately thirty millimeters. Of course, any suitable width for the recesses 40 is contemplated within the scope of the multiple disclosed embodiments.

Figure 5:
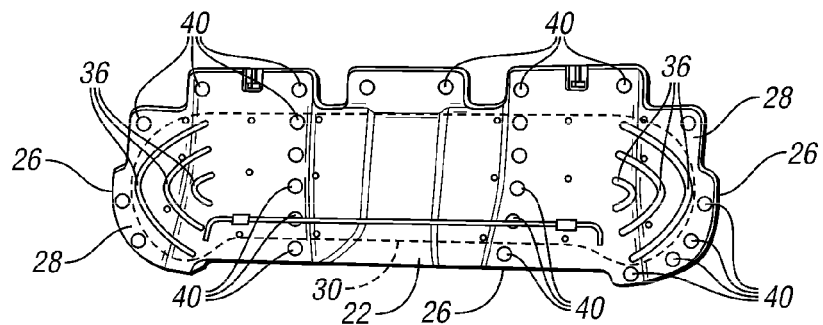
FIG. 5 is a top plan view of a portion of the vehicle seat assembly of FIG. 4.
Figure 6:
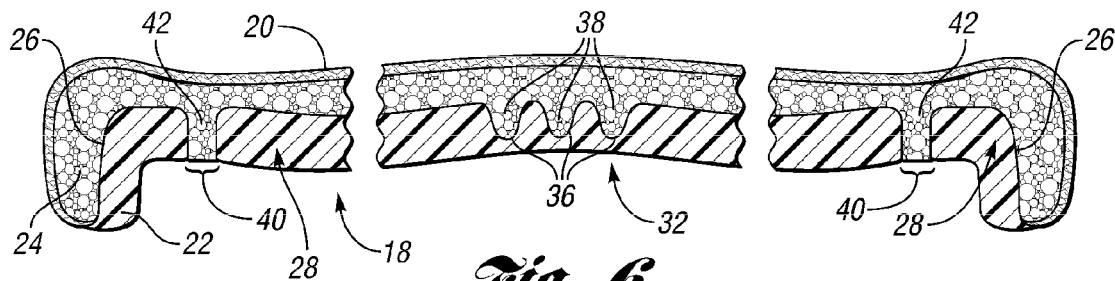
FIG. 6 is a cross-sectional view of a portion of another embodiment of the vehicle seat assembly of FIG. 1.
Figure 7:
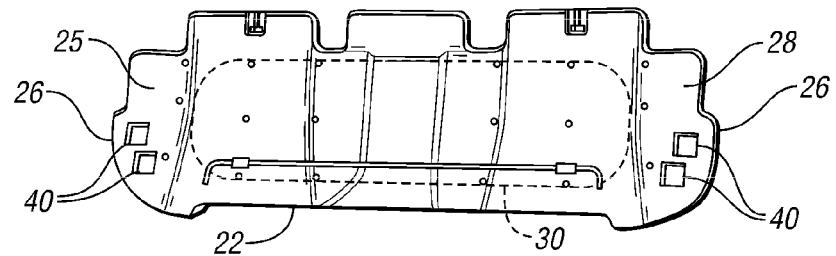
FIG. 7 is a top plan view of a portion of the vehicle seat assembly of FIG. 6.

The inner region 30 of the structural layer 22, as illustrated in FIGS. 4-6, may have channels 36 formed therein, as discussed above with reference to FIG. 2. Additionally, the cushion layer 24 may have corresponding protrusions 38 extending therefrom to be retained within the channels 36 of the structural layer 22, as discussed above with reference to FIG. 2.

In FIG. 5, an embodiment with the recesses 40 formed in various locations on the structural layer 22 is illustrated. The recesses 40 may be formed the edge region 28 proximate the edge 26 of the structural layer 22 and may be formed in the inner region 30. In at least one embodiment, the recesses 40 are only formed in the edge region 30. Of course, any suitable location for the recesses 40 is contemplated within the scope of the disclosed embodiments. In at least one embodiment, the recesses 40 may have increased depths proximate to the edge 26 of the structural layer 22 to facilitate retention of the cushion layer 24 on the structural layer 22 during occupant ingress and egress, during normal riding conditions and during impact conditions.

The recesses 40 may have a circular shape, as illustrated. In another embodiment, the recesses 40 have an oval shape. Of course, any suitable shape for the recess 40 is contemplated within the scope of the disclosed embodiments.

Figure 8A:
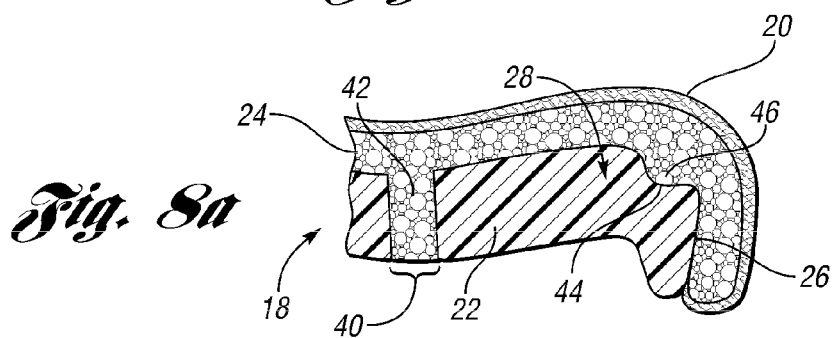
FIG. 8a is a cross-sectional view of yet another embodiment of a portion of the vehicle seat assembly of FIG. 1.

With reference now to FIG. 8a, another cross-sectional view of an embodiment of the cushion composite 18 provided proximate the edge 26 of the structural layer 22 is illustrated covered by trim material 20. The edge region 28 of the structural layer 22 has a recess 40 formed therethrough, as discussed above. In the illustrated embodiment, an anti-slip ridge 44 is formed within the structural layer 22 to locate the cushion layer 24 during assembly and retain the cushion layer 24 after assembly and during use. In the depicted embodiment, the anti-slip ridge 44 is provided adjacent the edge 26 of the structural layer 22. As shown in FIG. 8a, the cushion layer 24 has a protuberance 46 that are sized to be retained within the anti-slip ridges 44 of the structural layer 22. Of course, any suitable amount of anti-slip ridges 44 and protuberances 46 is contemplated within the scope of the disclosed embodiments. An interference fit may be employed between the anti-slip ridges 44 and the protuberances 46 to retain the protuberances 46 within the anti-slip ridges 44. Of course, the protuberances 46 may be retained within the anti-slip ridges 44 in any suitable manner.

Figure 8B:
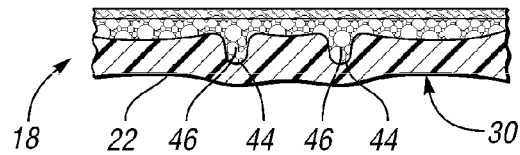
Figure 9:
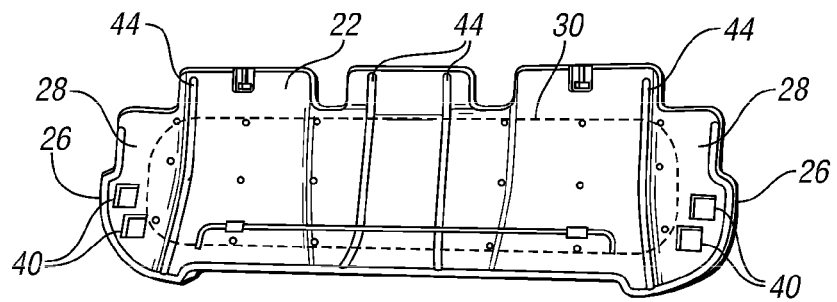
FIG. 9 is a top plan view of a portion of the vehicle seat assembly of FIGS. 8a-8b.

The anti-slip ridges 44 may be provided adjacent the edge 26 of the structural layer 22, as illustrated. As depicted in FIGS. 8b and 9, the anti-slip ridges 44 be formed in the inner region 30 of the structural layer 22 and may span from the edge region 28 across the inner region 30. Of course, any suitable location for the anti-slip ridges is contemplated within the scope of the disclosed embodiments.

Figure 10:
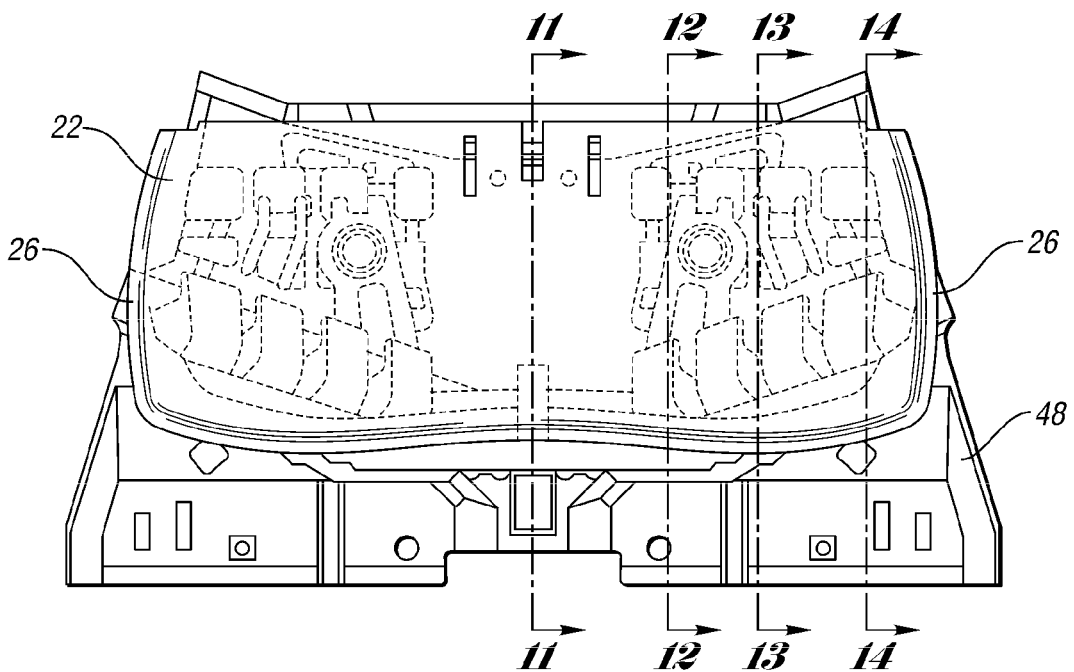
FIG. 10 is a front perspective view of an embodiment of a portion of the vehicle seat assembly of FIG. 1.

Now with reference to FIG. 10, another embodiment of a portion of the vehicle seat assembly 10 of FIG. 1 is illustrated mounted to a floor pan 48. The floor pan 48 is employed as a base for the vehicle seat assembly 10 and mounts the vehicle seat assembly 10 to the vehicle. The floor pan 48 may be made out of a sheet metal and formed as discussed further below.

With reference to FIGS. 11-14, the floor pan 48 has protrusions 50 formed therein. The protrusions 50 are formed in the floor pan 48 at various locations so that the structural layer 22 can be located and retained on the protrusions 50. The structural layer 22 has receptors 52 formed therein that are sized to receive the protrusions 50. During assembly, the receptors 52 locate the protrusions 50 to align the structural layer 22 upon the floor pan. After assembly and during use, the interaction between the protrusions 50 and the receptors 52 improves shock management, decreases squeaking caused by friction between the floor pan 48 and the structural layer 22, improves adhesion and retention of the structural layer 22 upon the floor layer and minimizes slippage of the structural layer 22 relative to the floor pan 48.

As illustrated, the protrusions 50 have a saw tooth shape that nests within the receptors 52. The saw tooth protrusions 50 allow for contact between the protrusions 50 and the receptors 52 in order to retain the structural layer 22 upon the floor pan 48 and also can reduce transfer of movement and/or vibrations between the structural layer 22 and the floor pan 48. An interference fit may be employed between the protrusions 50 and the receptors 52 to retain the protrusions 50 within the receptors 52. Of course, the protrusions 50 may be retained within the receptors 52 in any suitable manner.

Figure 11:
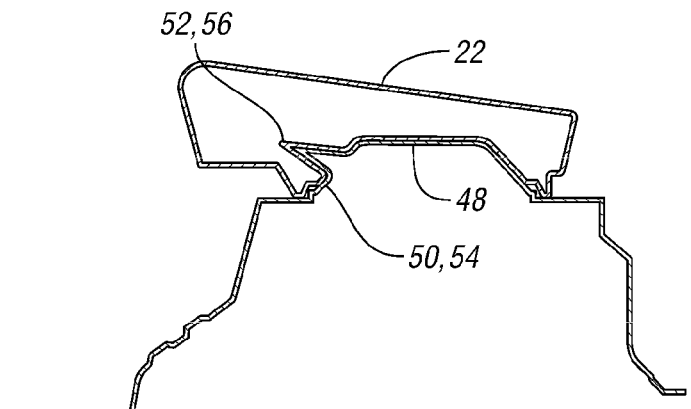
FIG. 11 is a cross-sectional view of a portion of the vehicle seat assembly of FIG. 10 taken along the line 11-11.

In FIG. 11, a first protrusion row 54 having one protrusion 50 is shown extending from the floor pan 48. The structural layer 22 has a corresponding first receptor row 56 having one receptor 52. As shown in FIG. 10, the cross-section depicted in FIG. 11 is provided towards the middle of the structural member 22 and the floor pan 48. Although one protrusion 50 and one receptor 52 are illustrated, any suitable amounts of protrusions 50 and receptors 52 are contemplated to be formed in the first protrusion row 54 and the first receptor row 56.

Figure 12:
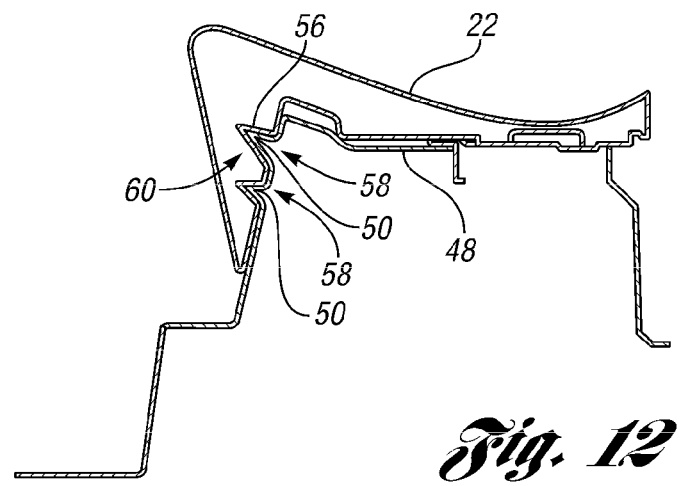
FIG. 12 is a cross-sectional view of a portion of the vehicle seat assembly of FIG. 10 taken along the line 12-12.

In FIG. 12, a second protrusion row 58 having two protrusions 50 is shown extending from the floor pan 48. The structural layer 22 has a corresponding second receptor row 60 having two receptors 52 formed therein that are sized to receive the protrusions 50. The second protrusion row 58 and the second receptor row 60 have a greater number of respective protrusions 50 and receptors 52 than the first protrusion row 54 and the first receptor row 56 of FIG. 11. As depicted in FIG. 10, the cross-section line 12-12 is provided proximate the cross-section line 11-11 and is provided closer to the edge 26 of the structural layer 22. Proximate the edge 26 of the structural layer 22 more protrusions 50 and receptors 52 may be provided to decrease slippage of the structural layer 22 relative to the floor pan 48 since greater lateral forces may be exerted on the structural layer 22 proximate the edge 26.

Figure 13:
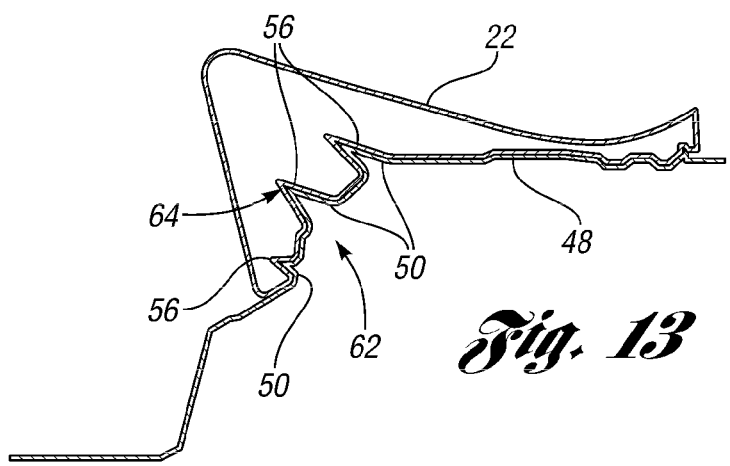
FIG. 13 is a cross-sectional view of a portion of the vehicle seat assembly of FIG. 10 taken along the line 13-13.

In FIG. 13, a third protrusion row 62 having three protrusions 50 is shown extending from the floor pan 48. The structural layer 22 has a corresponding third receptor row 64 having three receptors 52 formed therein that are sized to receive the protrusions 50. The third protrusion row 62 and the third receptor row 64 have a greater number of respective protrusions 50 and receptors 52 than the second protrusion row 58 and the second receptor row 60 of FIG. 12. As depicted in FIG. 10, the cross-section line 13-13 is provided proximate the cross-section line 12-12 and is provided closer to the edge 26 of the structural layer 22. Proximate the edge 26 of the structural layer 22 more protrusions 50 and receptors 52 may be provided to decrease slippage of the structural layer 22 relative to the floor pan 48 since greater lateral forces may be exerted on the structural layer 22 proximate the edge 26.

Figure 14:
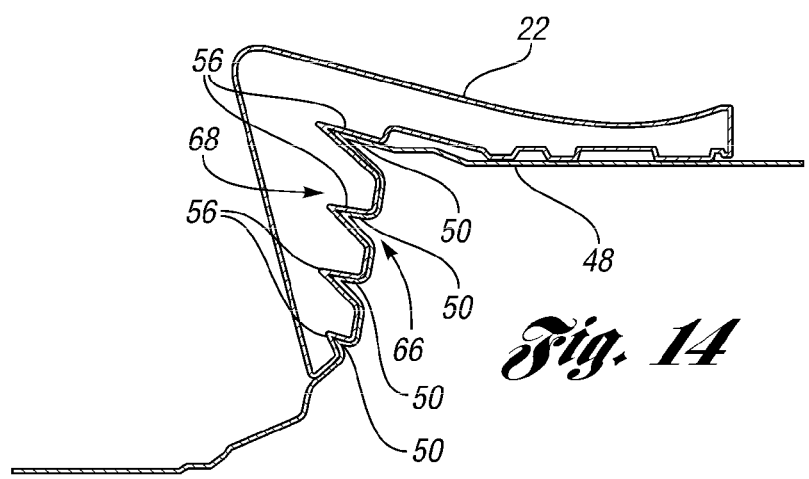
FIG. 14 is a cross-sectional view of a portion of the vehicle seat assembly of FIG. 10 taken along the line 14-14.

In FIG. 14, a fourth protrusion row 66 having four protrusions 50 is shown extending from the floor pan 48. The structural layer 22 has a corresponding fourth receptor row 68 having four receptors 52 formed therein that are sized to receive the protrusions 50. The fourth protrusion row 66 and the fourth receptor row 68 have a greater number of respective protrusions 50 and receptors 52 than the third protrusion row 62 and the third receptor row 64 of FIG. 13. As depicted in FIG. 10, the cross-section line 14-14 is provided proximate the cross-section line 13-13 and is provided closer to the edge 26 of the structural layer 22. Proximate the edge 26 of the structural layer 22 more protrusions 50 and receptors 52 may be provided to decrease slippage of the structural layer 22 relative to the floor pan 48 since greater lateral forces may be exerted on the structural layer 22 proximate the edge 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle seat cushion composite comprising:
    a structural layer adapted to be mounted within a vehicle to provide support to an occupant, the structural layer having at least two edge regions abutting at least two edges of the structural layer and having an inner region provided between the at least two edge regions, the structural layer having at least one channel formed therein; and
    a cushion layer provided adjacent to the structural layer, the cushion layer having at least one projection sized to be received within the at least one channel of the structural layer for minimizing lateral movement of the cushion layer relative to the structural layer proximate the edge regions.

2. The vehicle seat cushion composite of claim 1 wherein the at least one channel comprises a plurality of channels and the at least one projection comprises a plurality of projections; and
    wherein respective projections of the plurality of projections are each receivable within a respective channel of the plurality of channels.

3. The vehicle seat cushion composite of claim 1 wherein the inner region of the structural layer further comprises a plurality of receptors provided therein; and
    wherein the cushion layer further comprises a plurality of protuberances sized to nest within the plurality of receptors of the structural layer to minimize lateral movement of the cushion layer relative to the structural layer.

4. The vehicle seat cushion composite of claim 1 wherein the inner region of the structural layer further comprises a plurality of channels formed therein; and
    wherein the cushion layer further comprises a plurality of concave projections sized to be received within the plurality of concave channels of the inner region to minimize lateral movement of the cushion layer relative to the structural layer, wherein each of the edge regions has a width of 10 to 20 cm.

5. The vehicle seat cushion composite of claim 2 wherein the plurality of channels have a depth of at least ten millimeters and extend concavely proximate the inner region toward at least one of the edges of the structural layer.

6. The vehicle seat cushion composite of claim 2 wherein the structural layer has a density greater than a density of the cushion layer and the channels have a depth of 5 to 25 mm.

7. The vehicle seat cushion composite of claim 2 wherein the plurality of projections are retained within the plurality of channels with an interference fit and the channels have varying depths.

8. The vehicle seat cushion composite of claim 1 wherein the structural layer is made of expanded polyolefin.

9. The vehicle seat cushion composite of claim 8 wherein the cushion layer is made of foam.

10. A vehicle seat cushion composite comprising:
    a structural layer adapted to be mounted within a vehicle to provide support to an occupant, the structural layer having an edge region, with the edge region abutting an edge of the structural layer, the structural layer having an inner region provided within the edge region;
    a cushion layer provided adjacent to the structural layer, one of the edge region of the structural layer and the cushion layer having at least one recess formed therein, and the other of the edge region of the structural layer and the cushion layer having at least one projection sized to be received within the at least one recess for minimizing lateral movement of the cushion layer relative to the structural layer.

11. The vehicle seat cushion composite of claim 10 wherein one of the structural layer and the cushion layer further comprises anti-slip ridges and the other of the structural layer and the cushion layer comprises anti-slip protuberances sized to nest within the anti-slip ridges to minimize lateral movement of the cushion layer relative to the structural layer.

12. The vehicle seat cushion composite of claim 10 wherein the at least one recess is further defined as at least one aperture such that the at least one projection is received therethrough.

13. The vehicle seat cushion composite of claim 10 wherein the structural layer is made of expanded polyolefin and the cushion layer is made of foam.

14. A vehicle seat assembly comprising:
a floor pan adapted to be mounted within a vehicle; and
a seat body mounted on the floor pan to provide support to an occupant, one of the floor pan and the seat body having a plurality of receptors formed therein, and the other of the floor pan and the seat body having a plurality of protrusions formed therein and sized to be received within the plurality of receptors.

15. The vehicle seat assembly of claim 14 wherein the plurality of protrusions further comprises:
a first protrusion row having at least one protrusion; and
a second protrusion row having a plurality of protrusions such that the second protrusion row has a greater number of protrusions than the first protrusion row; and
wherein the plurality of receptors further comprises:
a first receptor row having at least one receptor and sized to receive the first protrusion row; and
a second receptor row having a plurality of receptors and sized to receive the second protrusion row.

16. The vehicle seat assembly of claim 15 wherein the plurality of protrusions further comprises a third protrusion row having a plurality of protrusions such that the third protrusion row has a greater number of protrusions than the second protrusion row and the plurality of receptors further comprises a third receptor row having a plurality of receptors and sized to receive the third protrusion row.

17. The vehicle seat assembly of claim 16 wherein the plurality of protrusions further comprises a fourth protrusion row having a plurality of protrusions such that the fourth protrusion row has a greater number of protrusions than the third protrusion row and the plurality of receptors further comprises a fourth receptor row having a plurality of receptors and sized to receive the fourth protrusion row.

18. The vehicle seat assembly of claim 14 wherein the plurality of protrusions have a saw tooth shape to nest within the plurality of receptors.

19. The vehicle seat assembly of claim 14 wherein the floor pan is made of metal and the seat body comprises a structural layer.

20. The vehicle seat assembly of claim 19 wherein the structural layer comprises expanded polyolefin.

* * * * *